United States Patent [19]

Baumann

[11] 4,125,129

[45] Nov. 14, 1978

[54] FIXED AND VARIABLE RESISTANCE FLUID THROTTLING APPARATUS

[75] Inventor: Hans D. Baumann, Woonsocket, R.I.

[73] Assignee: Masoneilan International, Inc., Norwood, Mass.

[21] Appl. No.: 708,337

[22] Filed: Jul. 26, 1976

Related U.S. Application Data

[60] Continuation-in-part of Ser. No. 565,158, Apr. 4, 1975, Pat. No. 3,971,411, which is a division of Ser. No. 444,020, Mar. 7, 1974, Pat. No. 3,908,698.

[51] Int. Cl.² ..................... F16K 47/04; F16K 47/08
[52] U.S. Cl. ........................... 137/625.3; 137/625.38; 137/625.37; 138/42; 251/127
[58] Field of Search .......... 137/625.3, 625.37, 625.38; 138/42, 43, 46; 251/118, 121, 127

[56] References Cited

U.S. PATENT DOCUMENTS

| | | | |
|---|---|---|---|
| 977,427 | 12/1910 | Armstrong | 138/43 |
| 2,118,290 | 5/1938 | Black | 138/42 |
| 3,529,628 | 9/1970 | Cummins | 138/43 X |

*Primary Examiner*—Arnold Rosenthal
*Attorney, Agent, or Firm*—Robert A. Cesari

[57] ABSTRACT

Fluid flow controlling apparatus comprising a variable area, variable resistance, axial-flowing, perforated plate or ring stack and solid plug or ring throttling apparatus. In combination with a variable resistance throttling device, a fixed fluid resistance element comprising a stack of perforated plates or rings.

13 Claims, 19 Drawing Figures

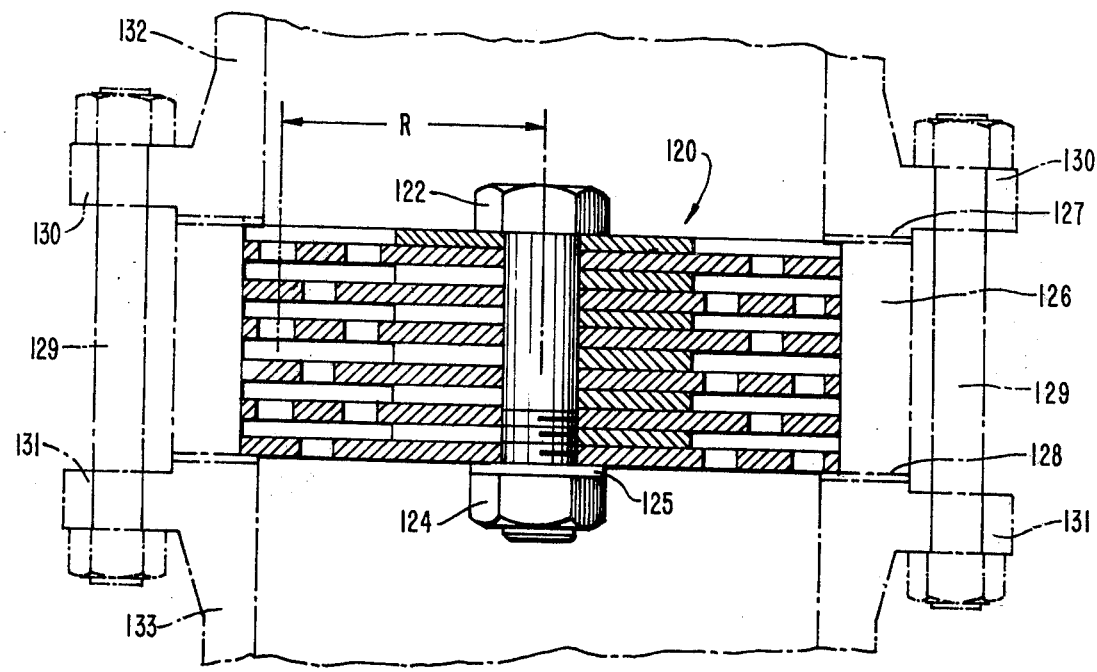
FIG. 15
FIG. 16
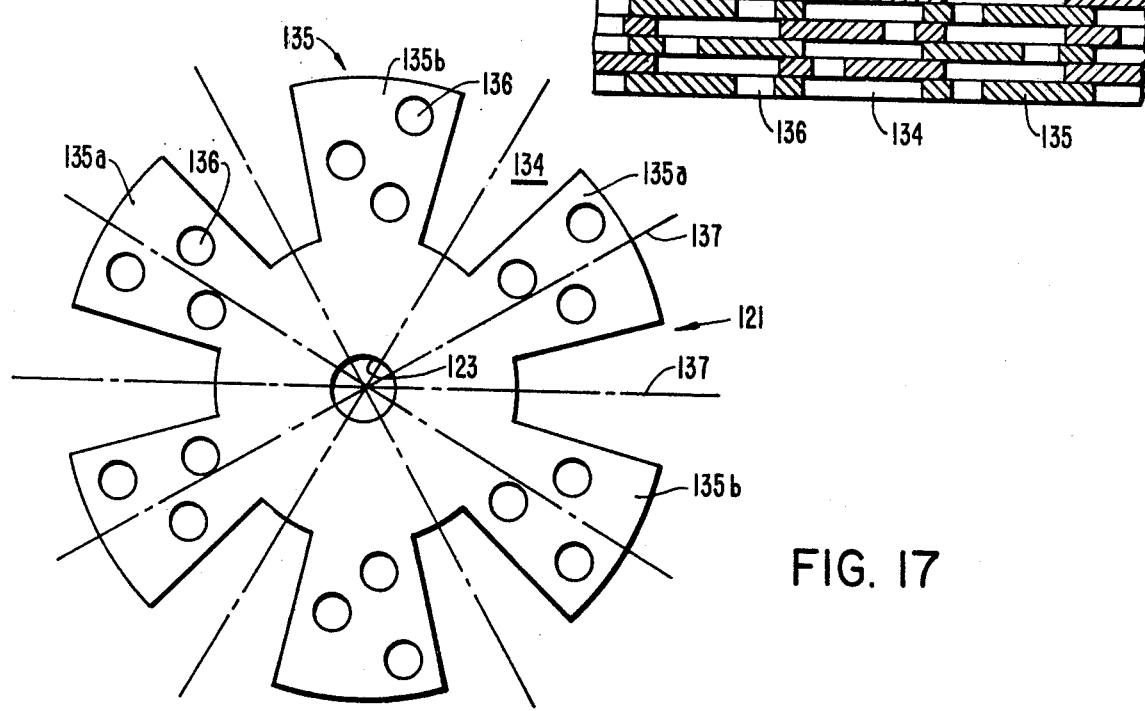
FIG. 17

FIXED AND VARIABLE RESISTANCE FLUID THROTTLING APPARATUS

CROSS-REFERENCE TO RELATED APPLICATIONS

This application is a continuation-in-part of application Ser. No. 565,158 filed Apr. 4, 1975, now U.S. Pat. No. 3,971,411 which application in turn is a division of parent application Ser. No. 444,020 filed Mar. 7, 1974, now U.S. Pat. No. 3,908,698 dated Sept. 30, 1975.

The plate stacks incorporated in the apparatus hereof comprise improvements on, and variable resistance trim and combination variable resistance trim-fixed resistance element applications or uses of, plate or ring stacks such as of my aforementioned applications, and also of my prior fixed resistance device applications Ser. No. 549,886 filed Feb. 14, 1975, now U.S. Pat. No. 3,987,809 and Ser. No. 591,172 filed Aug. 13, 1975, now abandoned.

BACKGROUND OF THE INVENTION

The field of this invention is apparatus for controlling flow under throttling conditions in order to regulate the level, temperature or pressure in process control applications.

Conventional valve throttling trim for such purpose usually consists of a lathe-turned plug of generally parabolic shape axially displaced in, or axially shiftable to close against or open from, a cylindrical orifice. The annulus formed between the outer periphery of the plug and the inside diameter of the orifice provides the desired flow area at a given lift position. The relation between such a flow area at any given lift to the flow area at maximum lift determines the flow characteristic of such a trim.

The combination of effective flow area and velocity headloss defines the flow capacity, usually expressed in Cv, where 1 Cv is the flow of 1 US gpm of water passing through a restriction under a pressure drop of 1 psi. As derived from the Darcey equation, wherein C is a contraction coefficient and K is the velocity head-loss coefficient:

$$Cv = \frac{38.1 \times C \times \text{area (in}^2)}{\sqrt{K}}$$

In conventional trim systems, since the velocity head-loss coefficient, or fluid resistance, is for all practical purposes constant (usually $K \approx 0.7$), the flow characteristic can only be determined through variations in flow area, which of course requires precision machining of the valve plug. Furthermore, the relatively smooth flow path between a parabolic plug and an orifice can lead to pressure recovery and therefore cavitation with liquids. In addition, most process control systems, due to pump droop and line resistance in series with the valve, require that the pressure drop across the valve should rise in inverse proportion to the square of the decrease in flow rate (i.e., at 25% flow the pressure drop can be 16 times higher than at 100% flow), and that the valve should therefore have a flow characteristic commonly called "equal percentage" to compensate for the non-linearity of pressure drop. But the achieving with accuracy of such characteristic, i.e., of the wanted variations in flow area, again requires the precision machining of a complex curvature on the valve plug. Further, since $$V = f(\frac{\Delta p}{K})^{\frac{1}{2}},$$

and since at low flow rates the differential pressure ($\Delta p$) is high, the conventional trims, with their relatively low velocity head-loss coefficient K, produce excessive fluid velocities at said low flow rates. As above indicated, these excessively high velocities cause cavitation or erosion of the trim with liquids. Similarly, since sound pressure level (SPL) = $f(V)^8$, with the conventional trims the high velocities occurring at the low flow rates cause substantial aerodynamic noise with gases.

In other apparatus such as of prior U.S. Pat. Nos. to Self 3,514,074 and 3,513,864, and to Cummins 3,529,628, the trims do provide a high resistance or velocity head-loss coefficient K, but through the use of labyrinthe flow passages, or passages having repeated, velocity-reducing changes of direction, that are formed between stacked washers such that the flow must be radially of the stack, or in a direction essentially perpendicular to the plug axis. Thus, and since the Self and Cummins washer stacks are uniformly constructed end to end, they have a linear flow characteristic, or linear increase in flow area with valve opening, that results, similarly as with the conventional trims, in substantially higher flow velocities at low flow rates.

Furthermore, all of the pressure drop across the labyrinthe washer stack flow passages occurs at the same time across the leading tip of the solid cylindrical valve plug employed therewith, this since the next stack opening — i.e., the one not yet exposed by the plug lifting — is at the low downstream pressure level, whereby substantial wear is experienced at the beforementioned plug tip point.

Still another disadvantage of the last mentioned prior art devices is that each set of flow paths constituted by a pair of perforated plates, such as of Self. U.S. Pat. No. 3,513,864, is required to be separated in the vertical direction from the next set by a solid wall, which produces a discrete pause in the rate of flow increase, which pause is detrimental for automatic control purposes.

Yet another shortcoming of the Self-Cummins devices is their requirement of relatively large pressure vessels to house the cylindrical disc stack. For example, for a 2 inch plug diameter having a maximum Cv of 30, the Self-Cummins stacked disc valves require a valve bonnet opening or flange of about 4 inches, or of about twice the size, and three times the cost and weight, of the conventional parabolic trim.

This invention solves the foregoing problems by the provision novelly of a valve trim whose specific fluid resistance changes in direct but inverse proportion to valve stroke. That is, as the conductive flow area of the valve trim gradually increases, in going from the closed to the open valve position, the trim impedance, or the total amount of resistance to fluid flow, gradually decreases from a maximum level near the closed valve position to a minimum value at the full open position, or the valve stroke position corresponding to the maximum obtainable flow passage area.

Among the many advantages of the invention trim, then, are:

1. The resistance of the valve trim is high when the valve is near-closed and fluid flow through the valve is low, i.e., when the typical pressure of the fluid is high and the resultant pressure drop across the valve is near its maximum level. The high resistance of the trim in the near-closed stroke position accomplishes the required kinetic energy conversion without incurring the excessive erosion or cavitation experienced with the conventional valve trims.

2. The resistance of the trim is low when the valve is near full-open, at which stroke position the fluid pressure at the valve inlet is greatly reduced (due to droop in pump characteristic, pipeline resistance, etc.), little pressure drop is required, and the actual physical behaviour of most controlled fluid systems is very nicely complimented.

3. The inverse relationship between flow area and resistance coefficient gives the invention valve trim an exceptional rangeability, or high ratio between maximum and minimum controllable flow. A typical valve trim of the invention could have 20 fluid conducting passages to be opened up consecutively while at the same time decreasing the resistance from a velocity head-loss coefficient $k$ of 20, when only one channel is exposed to flow, to $\approx 1$, when all channels are opened up. The amount of fluid "Q" passing a valve being expressed by the Darcey equation as $$Q = f\left(\frac{A}{\sqrt{k}}\right),$$

The ratio of Q maximum to Q minimum of the invention device accordingly is $$\frac{A_2 \sqrt{k_1}}{A_1 \sqrt{k_2}} = \frac{20 \sqrt{20}}{1 \sqrt{1}},$$

or nearly 90:1 for the stated area ratio of only 20:1. This contrasts with a rangeability of only 20:1 for a conventional valve trim having the same flow area ratio.

4. The valve trim hereof is enabled by the invention to be manufactured or fabricated without the precision machining required for, and hence without the tolerances handicapping, conventional trim, and so that all flow passages and their respective specific fluid resistances are uniform and reproducible. Not only are desired flow characteristics thus assured or obtained with a high degree of accuracy, but also the invention user is enabled to predict mathematically the exact flow relationship to be obtained with a selected pattern of the flow passages.

5. In the configuration for liquid media, the invention device's flow characteristic is a function of both a variable flow area and an inverse variable velocity head-loss coefficient K. The invention valve plug, then, not only does not require a precision contour but also provides for an increase in internal fluid resistance with decrease in flow — i.e., increase in pressure drop across the valve — thus assuring a nearly constant throttling velocity, with absence of erosion and noise.

6. The invention flow passages comprise a plurality of flow paths parallel to the plug axis and in which a number of restrictions are provided in series to achieve a high K factor. The series-restricted flow paths are formed in one disclosed embodiment as slots in the engaged surface or face of one and closed by the smooth bore or periphery of the other of the interfitting or slidingly engaged plug and seat ring, whereby both the number of the active flow paths and their specific resistances vary with the lift or stroke of the valve.

7. Whereas with the aforementioned Self and Cummins trims the substantial plug wear inducing "leakage flow" passes directly and unrestrictedly through the valve plug — seat ring gap or opening, any such flow with the invention apparatus is confined in a prolonged, narrow or shallow gap or channel or channels formed between a cylindrical plug and seat ring and in which the leakage flow is continually disrupted and interrupted by successive or series passageway restrictions, slots or grooves.

8. A surprising, extraordinary economic benefit, or great cost and space saving, is realized relative to the mentioned prior art trims; these require relatively large pressure vessels to house the cylindrical discs that are required, whereas with this invention the trim size is enabled to be nearly identical to that of conventional parabolic trim. For example, as embodied in a 2 inch diameter plug device the invention trim has a maximum c.v. of 30. A valve bonnet having an opening of about 4 inches diameter is required to accommodate a Self or Cummins patent stacked disc type valve of identical capacity. The weight of a 4 inch opening or flange bonnet is about three times the weight of the 2 inch bonnet, and the directly related cost reduction by the invention is similarly to about one third the cost of the valve and housing assemblies of the mentioned patents.

9. In case a high pressure drop independent of flow rate is required, such as for boiler feed-water recirculating valves, the invention can accommodate a fixed restriction in series with the movable valve trim. Such fixed restriction, absorbing more than 75% of the pressure drop at maximum flow, shifts the burden away from the movable valve plug, and so results in substantial additional cost benefit or savings in regard to the power required of the valve operator.

10. The invention enables a wider rangeability between minimum and maximum controllable flow, due to the combined variation of both K factor and flow area, than any conventional or prior art trim, this allowing substantial energy savings in liquid pumping systems, since very low valve pressure drop can be tolerated at the wide open valve position without distortion in the overall control valve gain.

11. The individual flow paths of the invention trim may be interconnected, in order to provide for a rapidly increasing flow area with successive increases in the flow path restrictions, in order to accommodate increase in volume following a reduction in pressure of gases, or to reduce velocity with liquids. The invention trim thus achieves or assures low outlet velocities, and resultant low aerodynamic noise levels, and thereby effectively combats, or solves, noise pollution problems.

12. As contrasted with the cast or milled solid metal trim of U.S. Pat. No. 3,908,698, requiring fluid passages entirely accessible from the circular interface between plug and seat ring and thereby a more costly manufacture and a less than full utilization of available flow capacity, the improved trim hereof overcomes such deficiencies through the use of stamped plates which, when stacked in certain or predetermined relationship, provide the exact desired characteristic in area increase and in resistance decrease as a function of valve stroke. Indeed, accuracy and repeatability are guaranteed by the present trim improvement, so long as the same stamping die is utilized.

13. With the perforated, stamped plate trim design of this invention, a larger or higher utilization of cross-sectional trim surface for flow area is achieved than heretofore possible or practical, by providing or stamping out additional flow passages within supporting segmental sections of the plug or seat ring.

BRIEF SUMMARY OF INVENTION

Stacked-plate, valve-associated fluid resistance apparatus having determinable flow characteristic, and more particularly providing both increase in flow area and decrease in fluid resistance with change in or as a function of valve stroke (away from the seat). Axially perforated plate or ring stack and mating, solid-cylindrical-member fluid resistance apparatus providing multiple, generally axial, series-restricted fluid passageways, the passageways having axial openings at their one ends and radial openings at their other ends, and said passageways being further arranged such that their area varies with, while their resistance varies inversely with, relative shifting of said plate or ring stack and interfitting solid cylindrical member.

In the accompanying drawings illustrating preferred embodiments of the invention:

FIG. 15 is a vertical section of a fixed fluid resistance plate stack of the apparatus, alternative to and differently installed than the FIG. 9 form of the fixed resistance element of the variable and fixed resistance combination.

FIG. 16 is a partial development in vertical section along the radius R of FIG. 15.

FIG. 17 is a top plan of a plate of the FIGS. 15–17 resistance element.

DETAILED DESCRIPTION OF THE INVENTION

Figure 2:
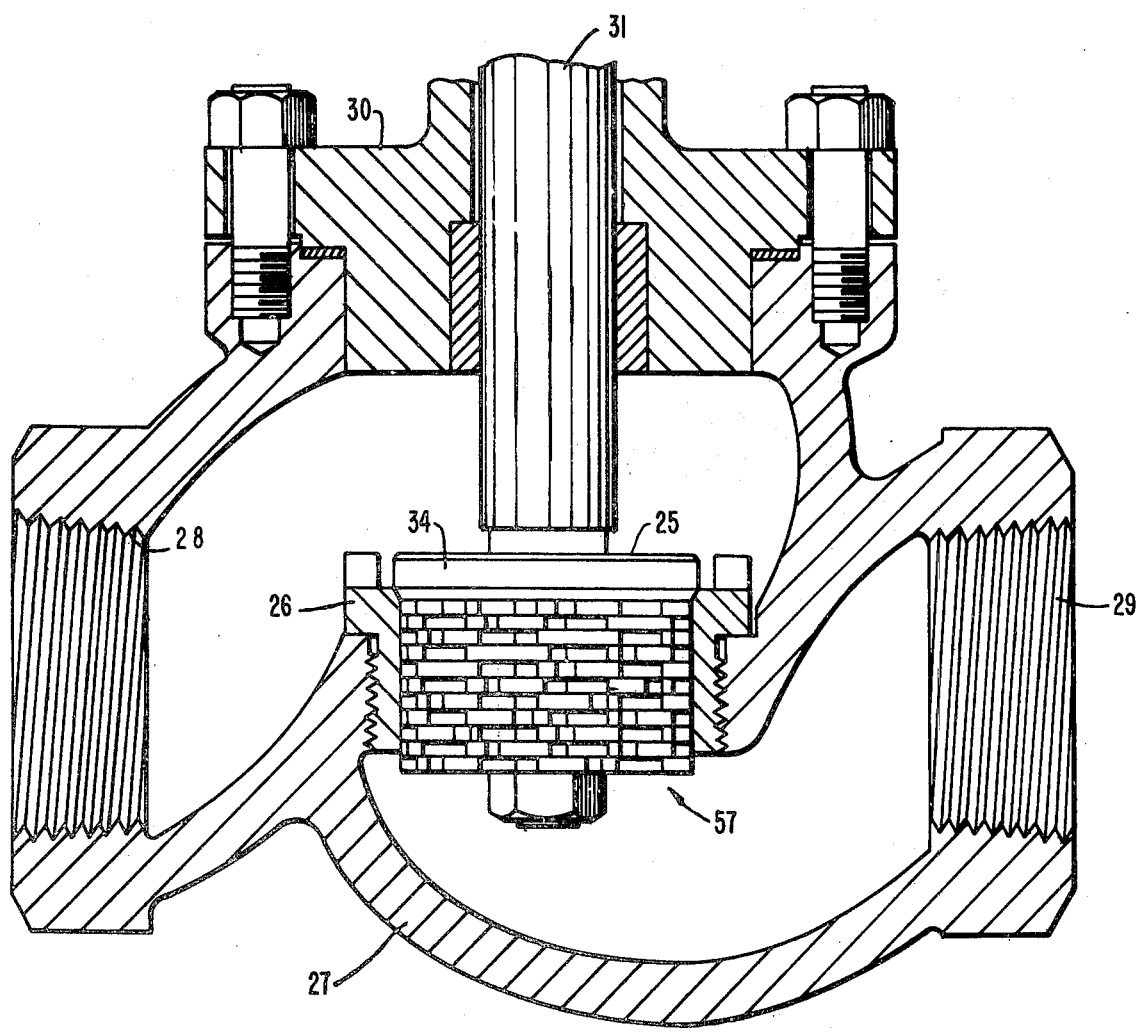
FIG. 2 shows a male or plate stack form of the invention apparatus, and in vertical section a housing and bonnet embodying the same.
Figure 3:
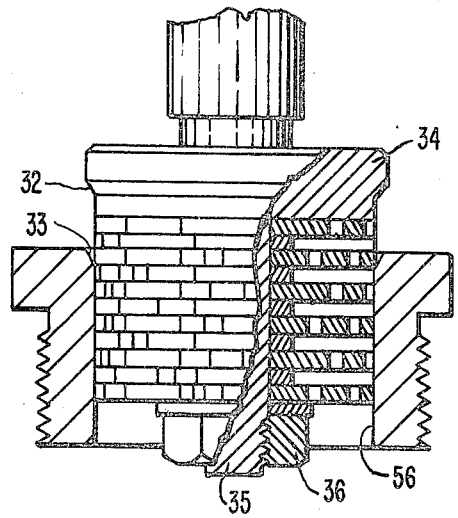
FIG. 3 shows the FIG. 2 apparatus partially lifted or upstroked from the seated position of FIG. 2, with the plug stack passageways shown partly in vertical section and partly in side elevation.
Figure 4:
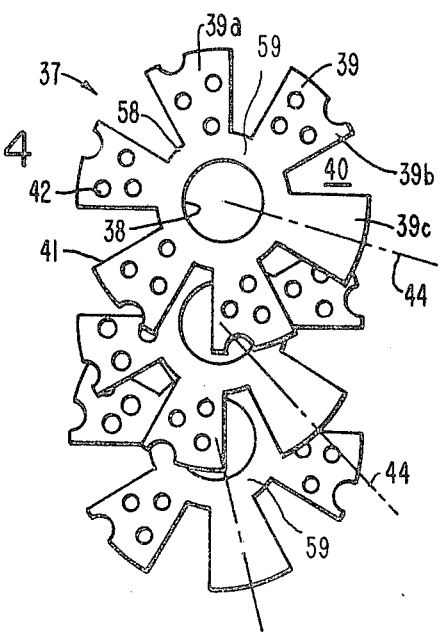
FIG. 4 is an exploded perspective of the plates, and showing their angular progression through the stack, of the FIGS. 2–5 embodiment.
Figure 5:
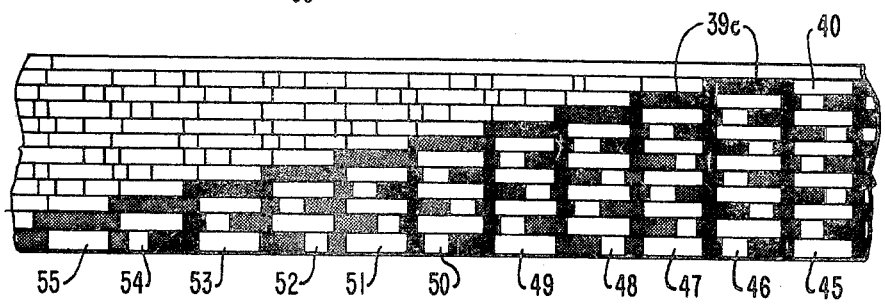
FIG. 5 is a schematic of a complete development of the periphery or circumference of the FIGS. 2–5 plate stack, showing the axially progressive terminating within the stack of all the fluid passageways.

The FIG. 2 apparatus comprises a cylindrical valve plug 25 having a snug sliding fit within cylindrical seat ring 26 which in turn is threaded into the intermediate partition or ledge opening of a conventional valve housing 27 having opposite end openings or ports 28, 29 adapting it for coupling or connecting into a fluid flow line, such as of a fluid system or process control system. Housing 27 mounts a usual access bonnet 30 providing means for the removal of valve plug 25 and seat ring 26, and it additionally mounts as conventionally external means such as a diaphragm actuator for reciprocating valve stem 31 and thereby the plug 25, in response to a command signal from a controlling instrument, towards and away from full closure or seating by face engagement of the mating, tapered, annular plug and seat ring surfaces 32, 33.

The plug 25 has a solid annular top or shoulder 34 from which depends a reduced, central, annular stem or center post 35 onto which is threaded a nut 36 clamping thereabove a set or stack of identical discs or plates 37 received by their center holes 38 over the post 35 and compressed together between the nut 36 and the underside of plug shoulder 34, and comprising the male or plate form, plug-incorporated, flat disc stack of the FIGS. 2–5 embodiment.

The plates or flat discs 37 comprise a number or set of first, generally solid, generally wedge-shaped segments 39 alternating with and spaced apart by a like number or set of second, voided or cutout, similarly wedge-shaped segments 40. The segments of each of the said first and second segment sets 39, 40 have identical widths, and the widths of the void second segments 40 are equal to or — as shown — less than the first segments 39 widths. In the stack the plates 37 are successively rotated about the stack axis, or differently angularly positioned relative to each other about the plug movement or valve stem axis, such that a particular wanted — i.e., the same — vertical or successive-plate alignment of segment margins is repeated about the circumference of the plug 25.

As shown, the first, substantially solid segments 39 have straight radial sides or flanks 41 that define also the side margins of the alternating, opening or recess forming cutout or void segments or recesses 40.

The substantially solid plate segments 39 have three forms, 39a, 39b and 39c. The substantially solid plates of the first two, alternating forms 39a and 39b each have a number or set of flow restricting ports or small holes 42 arranged or provided at at least two different plate radii, and at at least two different angles or positions circumferentially of the plates 37. The substantially solid segments 39a, 39b further have half-round peripheral or perimeter indents or cutouts 43, the cutouts all of the same size but located at one angular position in the 39a form segments, and at another angular position in the 39b form segments. The holes 42 of the form 39a segments are of the same number and size as, and at the same plate radii as, the holes 42 of the form 39b segments; and the angular positioning, or circumferential displacement from the segment center lines, of the holes 42 and indents 43 is of the same amount but opposite sign, in the form 39a and the form 39b segments. Thus the segments 39b are the reverse, upside-down of, or mirror image of, the 39a segments.

The third form 39c of solid material segments 39 comprises the single, wholly solid, blocking segment 39c shown.

In the plate stack the plates 37 are predeterminedly positioned with the successive plate continuously rotated, clockwise or counter-clockwise, by one segment width, or through the angle encompassed by one segment, from the next preceding plate. This is illustrated by the dash lines 44 drawn through the center lines of the solid blocking segments 39 of the three FIG. 4 plates, and showing that the solid or substantially solid segments 39 of each plate overlie or underlie the cutout segments 40 of the adjacent plates, that by the described segment forms 39a and 39b alternating, the vertically juxtaposed holes 42 and indents 43 are reversed as to their angular or centerline off-setting in every fourth plate in the stack, and that the blocking segments 39c progress around the plug circumference considered in either vertical or up or down direction.

Once assembled on the plug stem 35 in their described predetermined, progressively rotated, hole 42 offset-alternating positions, the plates 37 are fixed or clamped in their said actual and relative pattern or positions by turning up or clamping thereagainst the lock nut 36, and additionally, if desired, by brazing the stacked-plate plug assembly together.

In said assembly, the plates 37 combine with the snugly surrounding or close fitting ring 26, by the latter's closing over the large openings or passageways 40 and the small indents or recesses 43, to form vertically through the plate stack, and between it and the said seat ring 26, a series of throttling channels 45, 46, 47, 48, 49, 50, 51, 52, 53, 54, and 55, comprised each of the void segment formed, flow admitting, large horizontal openings or passageways 40 alternating with and communicating between the substantially solid segment recessing and perforating, flow restricting, small vertical ports or holes 42 and indents 43.

With the described angular progression of the plates 37, and reverse offsetting of every fourth plate restriction, the large horizontal passageways 40 flow the fluid in and out and back and fourth between and into the vertically adjacent, radially and circumferentially offset holes 42 and recesses 43, in continuously reversing, sinuous or tortuous paths comprising the throttling channels 45–55.

The described progression through the stack of the unapertured or wholly solid blocking segments 39c results in the throttling channels 45–55 extending progressively shorter lengths from the bottom or tip of the plug, from the full stack length of channel 45 down to the single plate length of channel 55, with the succeeding channels each being one plate less, or one passageway 40 or restriction 42, 43 less, in length than the preceding channel. The active or fluid conducting channels 45–55 comprise only the horizontal passageways 42 and vertical restrictions 42, 43 that underlie the blocking segments 39c because the channels 45–55 are completed by the cylindrical wall 56 of the seat ring 26, the same closing over the openings 40 and indents 43, and sealingly engaging the channel blocking or closing segments 39c. As comprised in the flow channels 45–55, the segment-wide horizontal passages 40, while being generally of a lesser width than the substantially solid segments 39, are yet of a width and depth to communicate with the restrictions or holes 42 of the intervening or overlying and underlying plates 37 whether the holes are arranged as in the segments 39a or are reverse offset or mirror imaged as in the segments 39b.

All the throttling channels 45–55 are, at their one ends common to the plug tip or bottom 57, endwise or vertically open to fluid from the inlet 29 in the full seated position of the valve. The channels 45–55 are then all closed at their other ends, vertically by the blocking segments 39c, and radially by the seat ring wall 56 extending above the uppermost of the blocking segments 39c to the seat taper 33 that engages the taper 32 of the plug shoulder 34.

The throttling channels 45–55 have bottom end opening to or admittance of the fluid from inlet 29 through their initial or bottom plate void segment passageways 40, or hole and indent restrictions 42, 43. Upon vertical passage through the holes and indents 42, 43, the fluid is free to travel horizontally in the passageways 40 in all directions, or either outwardly to the cylindrical wall 56, or laterally or circumferentially between the segment sides 41, or inwardly to the herein annular recess inner walls 58 that together define between them and the plate central openings 38 a base ring or root 59 for the projecting wedge segments 39. Because of the described progression and reverse hole patterning of the plates, then, and as partially indicated by the arrows in FIG. 3, the fluid flow through the relatively wide and deep channel portions or passageways 40 and the successive restrictions or plate segment holes and indents 42, 43, defines the channels 45–55 as sinuous or reverse winding fluid paths or courses, involving turning in the said passageways 40 circumferentially right or left, and/or radially in or out.

Upon opening of the valve, or herein lifting of the stem 31 and plug 25 as by an external pneumatic diaphragm or other actuator, the throttling channels 45–55 are opened successively or one by one, as their terminating walls or blocking segments 39c are in turn thereby raised sufficiently above the level of the seat ring 26 to open the respective throttling channel for fluid flow radially thereoutof past the seat ring 26 to the outlet 28 side of the valve. At maximum valve stroke "h", then, all channels 45–55 are free to discharge fluid therefrom.

The progressive upward movement of the plug 25 will of course first expose or open channel 45, will next open channel 46 along with channel 45, will next open channel 48 together with channels 45–47, and so on. In this, under the invention, with each addition to the number of throttling channels that are opened by the valve lifting, or with each positive variation, change or increase in the total area of the active flow channels by the valve or plug lift, there occurs negative change or inverse variation or decrease in the number of vertical restrictions 42, 43 that are effective in all said active channels, or that remain in the portions thereof that still lie below the upper limit of the cylindrical seat ring wall 56, which inverse variation or decrease in the number of effective restrictions is in direct proportion to the relative valve stroke "h".

The vertical restrictions, or segments 39a and 39b holes and indents 42, 43, it will be understood, supply or provide successive pressure reducing obstacles to the fluid flow within the active boundaries of, or seat ring 26-enclosed portions of, the fluid conduits or channels 45-55. Each of the said vertical restrictions has a velocity head-loss coefficient "k" of 1, where $$k = \frac{\Delta p \, 2 \, g}{V^2}$$

from the well known fluid mechanic relationship. Designating "K" as the total sum of "k" values contained in the longest channel 45, and designating "A" as the total vertical cross-sectional area in square inches (in.$^2$) of all fluid conduits, the flow coefficient "Cv" for each relative valve stroke position "h" is calculated as follows:

$$Cv = \frac{38.1 \, A \, h \, C}{\sqrt{K(1-h)}}.$$

In the above equation,
C = a contraction coefficient = 0.8, and
the term $\sqrt{K(1-h)}$ should be limited to 0.7 as a minimum value, since there are at least some minimal turbulant pressure losses in the body section, even with all channels exposed.

Figure 1:
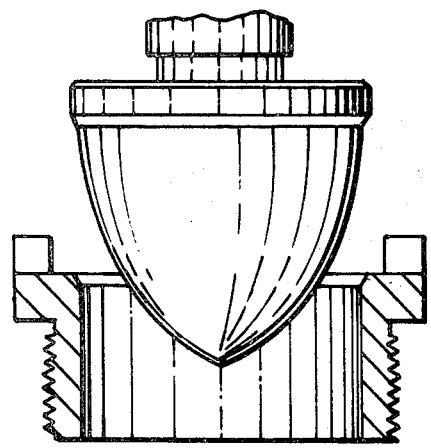
FIG. 1 is a partly sectioned side elevation of a conventional, parabolic throttling trim.

Under the invention, again, with each increase in flow area, or addition of one throttling channel, there is a corresponding decrease in the fluid resistance (K), due to omission or subtraction of one restriction from each of the active or exposed channels. As the foregoing equation demonstrates, the result is a truly exponential flow characteristic, which is of course superior to those obtainable with the conventional lathe-turned plugs such as illustrated in FIG. 1. Indeed, the obtained characteristic comes very close to the ideal characteristic for achieving a constant control valve gain in control applications, where the valve in the wide open position should, in order to conserve pump horse power, reduce little of the total pressure head produced by the pump. The desired or ideal characteristic for such control valve or process control service is expressed as:

$$\frac{Cv}{Cv \text{ max.}} = \frac{h \sqrt{Y}}{\sqrt{1 + (Y-1) h^2}} \text{ where}$$

Y = the ratio of the pressure drop across the valve when wide open to the pressure drop across the valve when near closed.

No commercially available valve having the ideal characteristic, as above expressed, this invention is the first and only which can provide such an ideal shape of the flow curve.

FIGS. 3-5, again, clearly show the stacked arrangement of the plates 37, the internal vertical flow path within each individual channel 45-55, and the drastic or abrupt changes in direction of the fluid when travelling in any channel from a restriction segment 39b of one plate through the void or passageway segment 40 of the next or second plate into and through the holes and recesses 42, 43 of the reverse restriction segment 39b of the next or third plate traversed by the channel.

By forming the voids or passageway segments 40 of the plates 37 narrower or to encompass smaller arcs than the generally solid, restriction forming plate segments 39, the said solid material segments 39 of the successive plates are assured overlap or supporting engagement in the described angular or rotational, one-segment progression of the plates about the stack axis or stem 35 as considered successively vertically through the stack. At the same time, the horizontal recesses 40 are of greater cross-sectional extent than the combined area of the segment 39a and b holes 42 and indents 43, in thus constituting the latter as the throttling channel restrictions.

Figure 6:
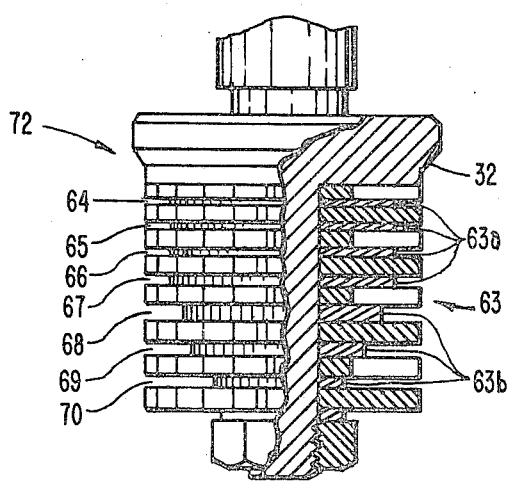
FIG. 6 shows an alternative form of the male or plate stack embodiment of the apparatus, with the flow passages shown partly in vertical section and partly in side elevation.
Figure 7:
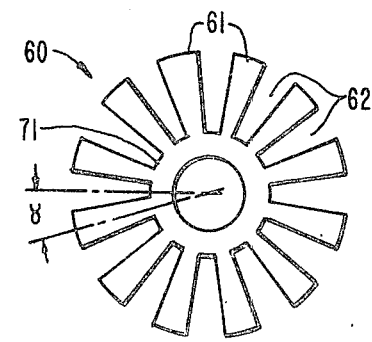
FIG. 7 is a top plan of a plate of the FIGS. 6–8 embodiment.
Figure 8:
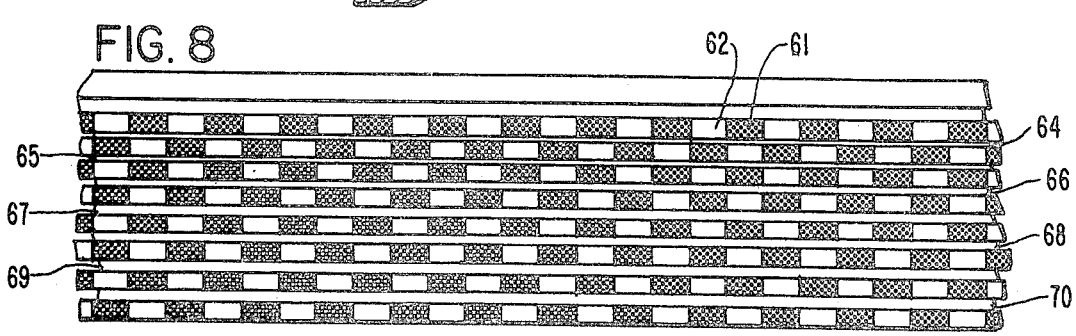
FIG. 8 is a schematic of a complete development of the periphery or circumference of the FIGS. 6–8 plate stack, showing the flow through all the passageways of the stack.

The invention embodiment of FIGS. 6-8 is better adapted or more suitable for throttling of compressible media, and comprises a number of identical plates 60 having duplicate, solid, wedge segments or teeth 61 alternating with duplicate, equal or lesser width void, recessed or slot wedge segments 62. The plates 60 are arranged in the stack to vertically present alternating or solid-void-solid segment sequences, with the solid segments or teeth 61 of one plate 60 directly overlying the void segments or recesses 62 of the next plate 60 of the stack, that again forming the perforated or apertured male component of a variable fluid resistance device comprising also the solid cylindrical female component or seat ring 26.

The void segments or recesses 62 are readily stamped or milled out of stamped or machined plates or washers, to define therebetween the solid wedge segments or teeth 61.

In the stack the plates or washers 60 are alternated with and spaced by a series of solid annular rings 63, that differ in thickness and/or radius so as to differentiate the areas or volumes of the annular grooves 64-70 that are provided between them and the enclosing or channel completing seat ring wall 56 by the said spacer rings 63 all being of a smaller radius than the plates or washers 60. Considered vertically downward, or in the reverse or outlet 28 to inlet 29 direction of fluid flow through the valve in this compressible medium suited embodiment, the spacer rings 63a are of the same diameter but progressively thicker, and the spacer rings 63b are of the same thickness but progressively smaller in diameter. The spacer rings 63a are shown as all of greater diameter than the inside diameters or base annulae 71 of, and as all of lesser thickness than, the plates 60; and the spacer rings 63b are also all of greater diameter than the inside diameter 71 of the said plate recesses 62, and/or of lesser thickness than the said plates or washers 60. Thus the peripheral grooves 64-70 left between the said spacer rings 63 and the said surrounding seat ring wall 56 comprise the restrictions of the flow channels or passages of the FIGS. 6-8 embodiment, with the individual flow areas or volumes of the recess-62-overlapping, annular restriction grooves 64-67 being successively increased by their having progressively increasing heights, and with the flow areas or volumes of the like annular restriction forming grooves 68-70 being successively increased in the flow direction by their having progressively increasing depth, or horizontal width.

Thus in this FIGS. 6-8 embodiment the variation with plug movement or lift of the effective or open but seat-ring-enclosed plug stack flow area results, not from a change in the number of active flow channels, but from the changing as described of the volumes or areas of the restrictions 64-70 that are active or effective in any given plug position, all the throttling passages of the plug being open to the downward fluid flow upon lifting of the plug one plate thickness for radially inward fluid flow into the one or upper end inlet recesses 62, for passages through the channels and discharge vertically through the endwise open or uncovered recesses or passages 62 of the other, opposite or lower end plate 60.

The described alternating of the plates 60 in the stack, which is to rotationally displace the successive plates by an angle α which, FIG. 7, is the angular distance between the center line of one tooth 61 and the center line of an adjacent slot 62, provides all around the circumference of the plug 72 entirely peripheral or seat-ring-closed fluid conduits or throttling channels, wherein the fluid flow vertically through the slots 62 of one of the plates 60, upon exiting therefrom and confronting and being blocked in further vertical direction travel by the solid teeth 61 of the next plate 60, must divide at and turn horizontally right and left in the intervening horizontal groove, as the groove 46, and travel laterally or horizontally therein through the angle α until enabled thereby to abruptly turn right-angularly down for flow vertically through the slots 62 of the next throttling channel plate 60.

In the FIGS. 6-8 embodiment, then, after lifting of the plug 72 to disengage its taper 32 from the seat ring seating surface 33, continued upstroke of the plug 72 first exposes or withdraws from within the seat ring 26 all the slots 62 of the initial or uppermost plate 60, then similarly exposes or withdraws all the slots 62 in the next or second plate 60, then likewise exposes or withdraws all the slots 62 in the next or third plate 60, and so on until, at maximum valve stroke "h", all plates 60 in the stack have been withdrawn from flow controlling or restricting engagement within the seat ring inner wall 56.

Further in the operation of the FIGS. 6-8 embodiment, at initial lift or partial valve stroke, the highest differential pressure occurs as only a relatively small area of horizontal grooves is exposed to the media to enter. However, an additional multitude of slots 62 and gradually enlarging horizontal grooves 64-70 provide gradual expanding and additional pressure-loss-producing fluid conduits between the unexposed cylindrical portion of plug 72 and the cylindrical seat ring wall 56. Each time the passing gas loses some of its pressure by expanding from a slot 62 into a horizontal groove 64-70, it expands in volume. However, since the next following groove in the downstream direction provides an even greater flow area, it compensates for this change in volume, thereby assuring a nearly constant throttling velocity. This velocity is ideally less than sonic, in order to reduce the aerodynamic throttling noise level which varies to the eighth power of subsonic velocity. Typically with increase in flow, the pressure drop, and therefore the volume modifying ratio P1/P2, decreases, particularly if additional fixed restrictions are employed downstream. The invention automatically compensates for this by continually decreasing the ratio between the exposed flow area and the areas of successive unexposed slots with increase in valve stroke.

Figure 10:
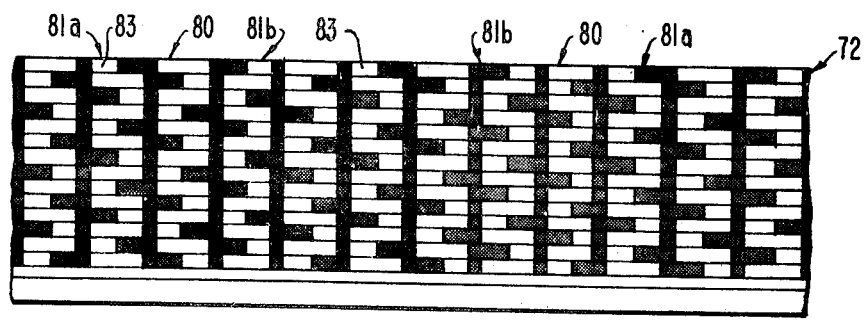
FIG. 10 is a schematic of a complete development of the inside periphery of the ring-stack of FIG. 9, again showing all the flows through the stack.
Figure 11:
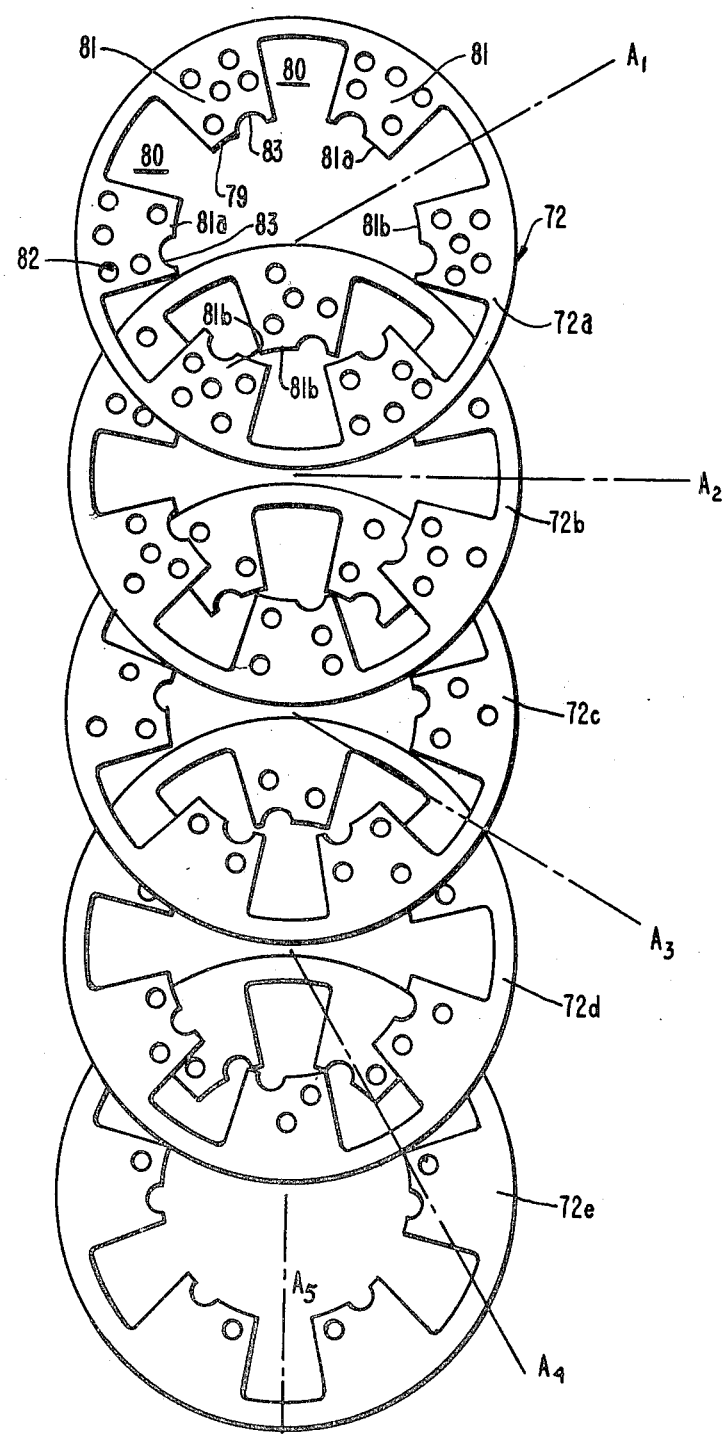
FIG. 11 is an exploded perspective of the ring-stack of FIG. 9.
Figure 9:
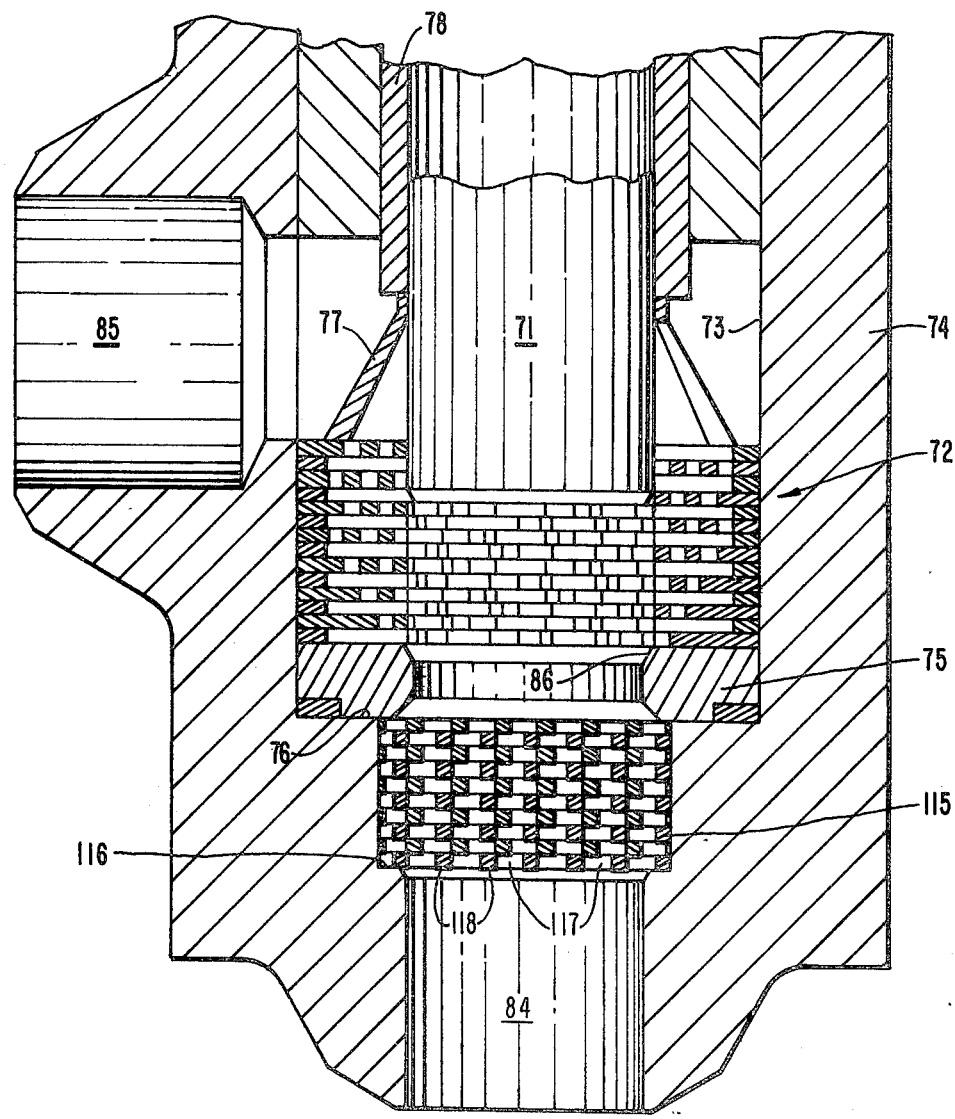
FIG. 9 shows a female or ring stack embodiment of the apparatus, and which incorporates a valve-abutting, plate-stack, fixed resistance device.

In the embodiment of FIGS. 9-11, the valve plug 71 is solid cylindrical, and the throttling flow channels or fluid conduits are formed in a set or stack of female form throttling elements, or annular discs or rings 72, received in the bore 73 of housing 74 and seated on and combining with the solid ring 75 to form the valve seat ring. The plates 72 are held down or pressed down against ring 75, and ring 75 in turn against the internal housing shoulder 76, by rib cage 77 depending from guide-sleeve 78. The plates 72 may additionally be brazed to each other and to the solid ring 75 to form therewith a unitary seat ring assembly.

The identical rings 72 have inner peripheries or bores 79 penetrated by radially outward extending, wedge-shaped openings, recesses, or void segments 80 alternating with substantially solid wedge segments 81 of which one set 81a has one pattern of vertical flow restrictions, ports or holes 82 and half round or other peripheral indents or recesses 83, and the other, alternating set 81b has like restrictions, or holes 82 and recesses 83, that are radially and/or angularly or circumferentially displaced or offset from the vertical restrictions or holes and recesses of the first set.

In the stack, the plates 72a, 72b, 72c, 72d, 72e are progressively angularly rotated by the angular distance or width of one segment, as represented by the center lines $A_1$, $A_2$, $A_3$, $A_4$, $A_5$, FIG. 11, of the same void segment 80.

The described vertical juxtaposing of the reverse pattern or otherwise offset holded and indented segments 79a, 79b results in the generally vertical flow through the stack again following continuously tortuous or reverse turning paths, in that the holes 82 and inner indents 83 of one substantially solid segment 81a are positioned vertically opposite to solid portions of the vertically next substantially solid segment 81b, by the described one-segment-width rotational progression of the plates through the stack.

Additionally in the FIGS. 9-11 embodiment, the number and/or size of the vertical restrictions or holes 82 is gradually increased, from the housing inlet 84 to the housing outlet 85, or from the bottom to the top of the stack.

In the stroking of the FIGS. 9-11 valve embodiment, then, or lifting of the plug 75 away from sealing engagement thereof against the ring 75 taper or valve seat 86 towards the maximum stroke position of FIG. 9, both an increasing number of the recesses or horizontal throttling channel passageways 80 are open to or inletting the fluid, and the fluid is required to pass a decreasing number of the vertical throttling channel restrictions, or holes 82 and indents 83. At the same time, in any partial stroke condition thereof, the valve is characterized by gradually expanding flow area downstream of the exposed or uncovered of the rings 72, through the remaining rings, that are closed or close fit at their inner or seat ring wall forming peripheries 79 by the sliding plug 71, having herein, FIG. 11, a progressively larger number of holes 80.

If with the FIGS. 9-11 embodiment it is desired to reduce the flow, the indents or recesses 83 may be omitted.

Most of the wear and damage to valve trim at high pressure drop of liquids is produced by cavitation, particularly with boiler feed-water. Cavitation can happen only when the static pressure, decreasing due to the high velocity generated by the throttling process, reaches the vapor pressure of the fluid. The decreasing of the velocity through the succeeding throttling stages avoids, or forestalls the possiblity of, such cavitation. Area increase concurrently with valve stroke is provided by the invention, then, not only to obtain a desired flow characteristic, but also to accomplish the aforementioned cavitation preventing, gradual reduction in fluid velocity downstream of the primary restriction.

Figure 12:
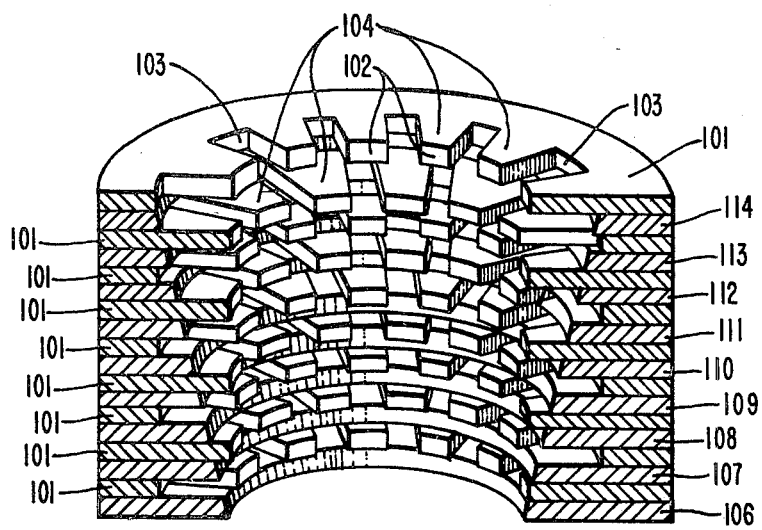
FIG. 12 is a broken away or half-section perspective of an alternative form of female or ring-stack embodiment of the apparatus.
Figure 13:
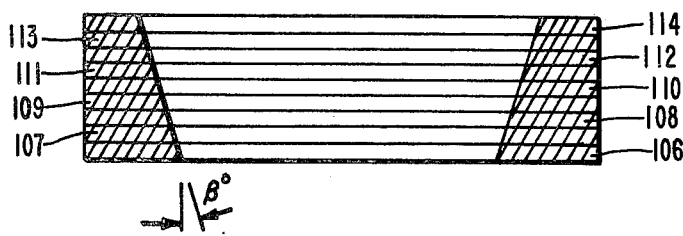
FIG. 13 is a vertical section of washer elements of the FIG. 12 ring-stack.
Figure 14:
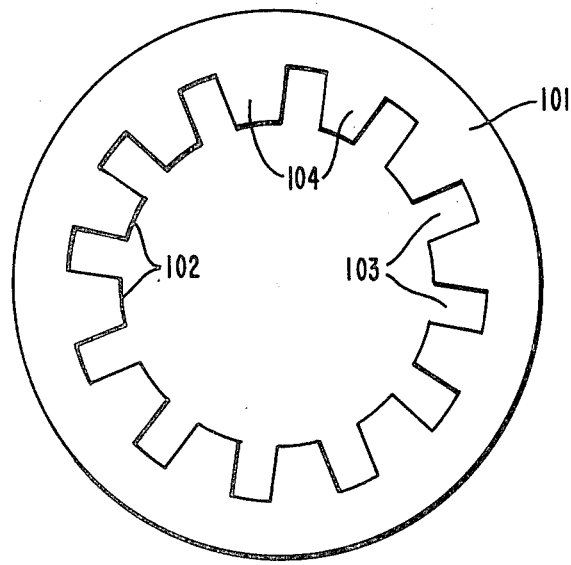
FIG. 14 is a top plan of one of the rings of the FIG. 12 stack.

In the female or seat ring embodiment of FIGS. 12-14 the throttling apparatus comprises a set or stack of identical annular discs or rings 101 having formed or stamped out of their inner, cylindrical-plug-engaged peripheries 102 a series of like, equally spaced, radially projecting recesses, openings or void segments 103 alternating with a complementing series of wedge-shaped solid segments or teeth 104 left or formed therebetween.

In the throttling stack the plates 101 are alternated with a series of solid cylindrical spacer rings 106-114, which rings have been machined in a stack on a lathe along an angle $\beta$, FIG. 13, to gradually increase the depth of the horizontal flow passages left between the spacer rings 106-114 and the cylindrical plug, and thereby to provide, in the FIGS. 12-14 embodiment as in the FIGS. 9-11 embodiment, for (1) a gradual increase in flow area with stroke, (2) an increase in flow area downstream of the principal restriction, and (3) a gradual decrease in overall resistance for each flow channel with increase in valve stroke.

In regard to its flow channels the FIGS. 12-14 embodiment is the female counterpart of the FIGS. 6-8 form, in that the plates 101 are progressively angularly displaced or rotated in the stack such that the solid segments 104 of one plate are vertically juxtaposed to the void segments 103 of the next or adjacent plates, and whereby in its vertical flow through the recesses 103 the fluid is constantly confronted and turned aside, or forced laterally in the passages within the spacer rings 106-114, by the radial inward projecting teeth or solid segments 104, and thereby made to follow, as before, a continuously reversing or sinuous, right angle or vertical-to-horizontal-to-vertical turning flow path.

In the smaller valve sizes the seat ring configuration of FIGS. 12-14 is preferred to that of FIGS. 9-11, for whose described plate or ring perforations or holes space may be lacking in such sizes.

FIG. 9 shows that particularly where a high pressure drop independent of flow rate is required, such as with boiler feed water recirculating valves of several thousand psi pressure drop, the invention trim or throttling apparatus may further comprise, in series combination with the stacked throttling rings or plates such as therein the plates 76, a downstream fixed resistance means, device or element capable of absorbing the bulk of the throttling energy being converted in the valve near maximum flow rates, and comprising a series or set of like or identical discs or plates 115 received in housing 78 and clamped against inlet 83 counter-bore or shoulder 116 by seat ring 79 whose inside diameter is smaller than the plates 115 outside diameter.

The plates 115 are thus without central stem or bolt receiving openings, and are formed instead with a pattern of vertical through openings or perforated holes 117 equidistantly spacing the solid plate sections or portions 118 defined and left therebetween.

The horizontal locating or dimensioning of the pattern of holes 117 is such that by relatively rotating or alternately inverting the successive plates 115 of the stack, the solid segments of the alternate or every second plates are vertically juxtaposed, and with one half of each of the holes 117 of one plate overlapping the opposite half of the corresponding holes of the adjacent plates, and whereby the fluid passing through the stack is again made to follow continuously reversing, tortuous or sinuous flow paths.

Being a fixed resistance element, the pressure drop across the plates 115 stack will vary with the square of the flow rate. For example, if the pressure drop across the element is 76% of the total valve pressure drop at maximum flow, then the pressure drop is only 19% at half the rated flow. Consequently, the presure drop across the variable resistance trim, or plug 75 and plates 76, will vary from 24% wide open to 81% at 50% rated flow. Which is precisely the desired characteristic of the invention, that is, to give economic benefit by providing high resistance, or capability of absorbing high pressure drop, only when the demand for flow, or needed flow area, is low, since it is much more economical to absorb the maximum energy change with a relatively inexpensively produced fixed resistance device.

The fixed resistance element of the variable and fixed resistance throttling apparatus combination may be variously constructed and arranged.

FIGS. 15-17 show a fixed resistance element or assembly 120 of duplicate stacked plates 121 held or clamped together as by a headed bolt 122 passed through central plate openings 123 and having turned up thereon a threaded nut 124 locked by washer 125. The fixed resistance element is in this instance located further downstream than the FIG. 9 fixed resistance element, and is made independently accessible through its retaining within a housing or ring 126 clamped with seals 127, 128 by tie rods 129 through flanges 130, 131 on pipes 132, 133 such as of a fluid control system containing also the FIG. 9 or other variable resistance throttling means of the invention, and which pipes may generally seat the downstream fixed resistance plate stack by their inner diameter being smaller than its outer diameter.

The annular discs or plates 121 comprise identical, uniformly spaced, radially indenting, wedge-shaped recesses or void segments 134 alternating with the radially projecting, wedge-shaped, substantially solid segments 135 formed by the stamping of the plates to provide the openings 134. The projecting segments 135 are all formed with patterns of small holes 136 of like number, size, radial placement, and degree or extent of offset from the segment center lines 137. Under the invention, however, the segments 135 are divided into the alternating sets 135a, 135b, by the hole groups or sets of the latter being the mirror image of the hole groups or sets of the former. Thus in the example shown, the segments 135a have two holes offset counter-clockwise and one hole offset clockwise from their center lines 137, and the segments 135b reversely have two holes offset clockwise and one hole offset counter-clockwise from their center lines 137. The openings or recesses 134 are narrower than the segments 135, whereby the latter overlap and support each other in the stack, FIG. 16, but of greater angular widths than included within the patterns of holes 136, and so as to encompass, or leave uncovered, said holes, in the stack.

In said stack, or in the fixed resistance element 120, the plates are progressively rotated, or successively angularly displaced one from the next, by the angle or angular distance between adjacent segment centers 137, and so that the substantially solid segments 135 of alternate of the plates 121 are vertically juxtaposed, and are spaced by the intervening and correspondingly vertically aligned openings 134 which in the stack define relatively wide deep horizontal passage areas in which the fluid may travel radially and/or circumferentially in passing from one to another group or set of the small vertical restrictions or holes 136. The described mirror image or reverse offset patterning of the holes 136 of the alternating segments 135a, 135b results again in the fluid passing through the stack in a generally vetical or perpendicular-to-the-plane-of-the-plates direction, while being made to follow more particularly a continuously reversing or back and forth, tortuous or sinuous path between the successively clockwise and counter-clockwise offset holes 136.

With the stacked plate fluid resistance element hereof, the number of restrictions for the passing fluid may be varied by selecting or adjusting the number of plates employed in the stack to suit particular requirements. The velocity head-loss, $h = V^2/2g$, is approximately identical to the number of plates stacked in the series, while the amount of fluid passing the resistance element is related to the number of holes provided in a given segment multiplied by the total number of segments within each plate.

Utilization of the stamped plate fixed resistance element in downstream combination with the variable resistance trim increases the overall efficiency of the throttling system, particularly when employed in high pressure drop gas or steam applications. In reducing a 1000 psi gas to 100 psi, for example, it is more economical to reduce to 500 psi in a 2 in. valve, and then further reduce the 500 psi to 100 psi in the 6 in. pipe line. Whereas to accomplish the total reduction at the valve would require that to be a 6 in. size, or more expensive than the 2 in. valve trim and 6 in. pipe line fixed resistance element combination.

The downstream fixed resistance element or device, whether in the valve housing or in the associated pipe line, may vary in plate number, segment layout, hole patterning and otherwise, within the invention and to supply or suit particular or specified velocity head-loss and flow area requirements.

Figure 18:
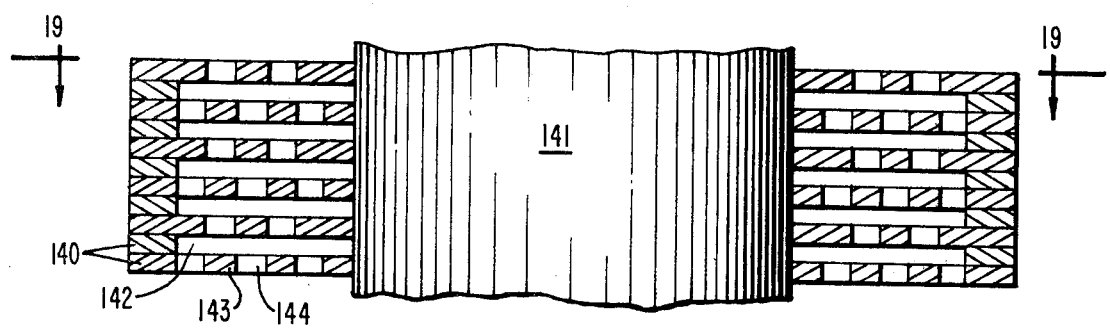
FIG. 18 is a vertical sectional view of a female or ring embodiment of the fixed resistance throttling stack, taken along the line 18—18 of FIG. 19.
Figure 19:
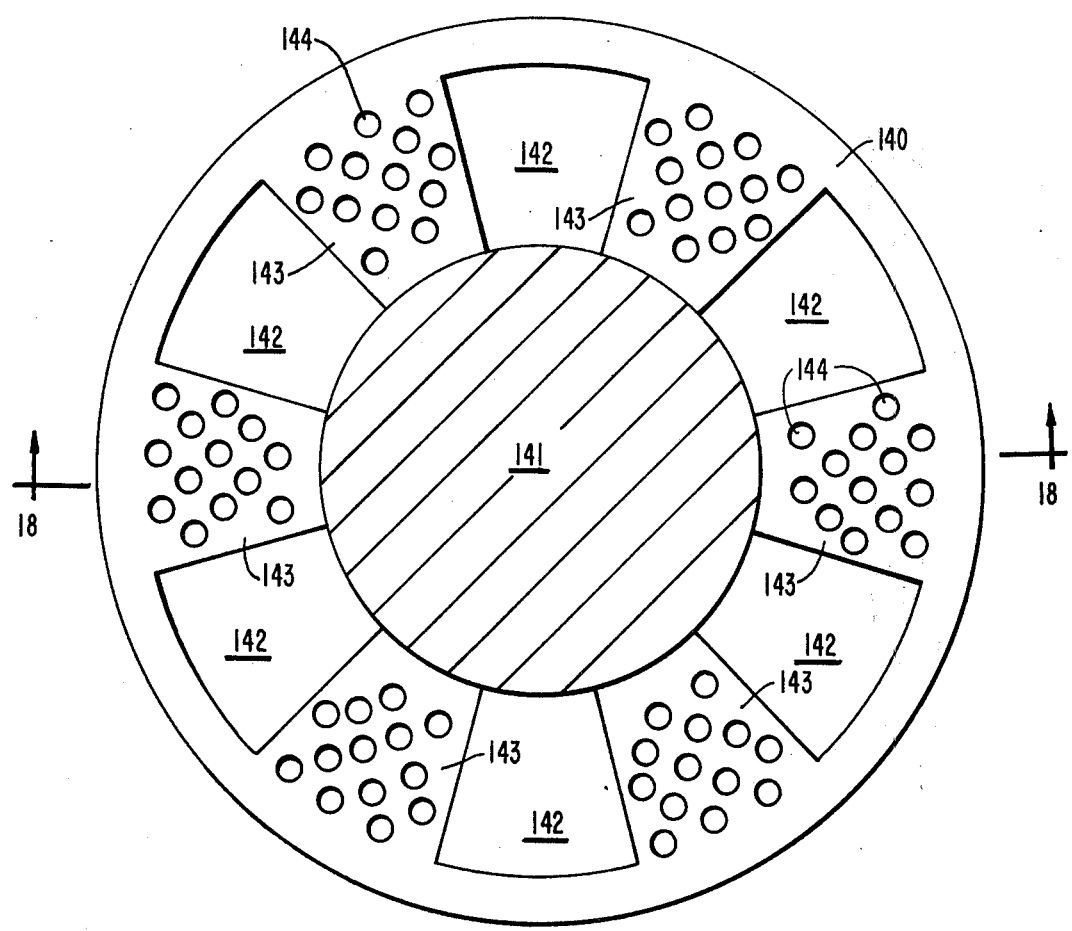
FIG. 19 is a top view of one of the rings comprising the FIG. 18 fixed resistance ring-stack.

Thus the fixed resistance device or element may also have the female form of FIGS. 18 and 19, wherein the throttling means comprised a set or stack of identical annular discs or rings 140 received over a engaging a mating solid cylindrical plug member 141 and indented or penetrated from their inner peripheries by wedge or pie-shaped large recesses or openings 142 stamped out of the rings 140 and alternating with the inwardly projecting wedge segments 143 formed thereby and which also have stamped therein identical sets or patterns of multiple vertical restrictions or small holes 144.

In the stack the rings 140 of the FIGS. 18, 19 embodiment are again progressively angularly rotated one from the next by the angle or angular distance between segment centers, and are fixed in said arrangment of relative angular displacement by brazing or clamping in any desired manner. In this case, however, to achieve the same described tortuous or sinuous directing or courses of the fluid flow, and since all holes 144 are clockwise or counter-clockwise offset from the segment center lines, requires only the inverting or turning upsidedown of every fourth plate in the stack, FIG. 18. In this construction, apart from the mentioned requirement of their offsetting, there is, again, no limitation in the number, shape or general arrangement otherwise of the small vertical restrictions or holes 144. The large passages or openings 142, affording the horizontal or radial and/or circumferential flow between the vertically offset holes 144, are equally spaced and are of equal or lesser angular width then the segments 143, and in the stack encompass within their angular width the angular width portions of the segments 143 that is occupied by holes 144, and so as to leave the same entirely uncovered.

In the following claims, "discs" refers generically to the plate elements, or disc or ring elements, of both the male and female stack forms.

I claim:
1. In a fluid throttling apparatus
   a number of horizonal, flat, annular stamped metal discs,
   said discs fixedly concentrically face-engaged in a vertical stack having inner and outer peripheries, one of which peripheries comprises a cylindrical wall,
   a cylindrical member having a cylindrical wall for mating engagement with said cylindrical stack wall,
   at least some ones of said discs provided with horizontal flow area openings,
   at least some others of said discs constructed and arranged in said stack to provide vertical flow restriction orifices,
   all said flow area openings of said discs being open to said cylindrical stack wall and closed to the other stack periphery,
   said flow area openings of said ones of said discs having radial and circumferential extent to encompass the area of said flow restriction orifices provided by said others of said discs,
   said ones and others of said discs so sequenced and so relatively rotated in said stack as to define therewithin and around its said wall generally vertical fluid throttling channels comprised each of alternating series of vertically juxtaposed flow area openings and flow restriction orifices,
   said discs further constructed and arranged to reversingly horizontally offset the vertically successive orifices of said channels whereby said channels define toruous passageways in which the fluid is made to travel horizontally in said openings and to turn right angularly into and out of said orifices,
   means for relatively vertically shifting said stack and cylindrical member between full closed and full open positions of greater and lesser overlapping of said stack wall by said mating cylindrical member wall,
   means for closing off vertical flow through the end of said stack that is overlapped by said cylindrical member only in the full closed position of said stack and cylindrical member,
   whereby in the between full closed and full open positions of said stack and cylindrical member the flow into and out of said tortuous passageways is only radial at said one, vertical-flow-closed end of, and only vertical at the other, cylindrical-member-overlapped end of, said stack, and
   means for varying at least one of the (a) active number and (b) effective area of said channels as said stack and cylindrical member are shifted between their said closed and open positions,
   said varying by said means such that said shifting varies the flow area and inversely varies the flow resistance of said stack.
2. The apparatus of claim 1, wherein said stack discs have each a radial, throttling-channel-closing, solid segment, and
   wherein said sequencing and relative rotating of said discs position said solid segments to close said throttling channels at progressively varying lengths of said stack, whereby said relative vertical shifting of said stack and said cylinder member progressively varies the active number of said channels and thereby the flow area of said stack.

3. The apparatus of claim 1, wherein said ones and others of said discs are identical and comprise circumferentially alternating, radial, flow area opening providing and flow restriction orifice providing segments, and wherein said flow restriction orifice providing segments comprise two alternating segment sets, the segments of both sets having patterns of restriction orifice holes that are identical in number, size, radial distribution, and extent of offset from the segment center lines, the direction of offset of one said hole set being counter-clockwise and the direction of offset of the other said hole set being clockwise, whereby the hole patterns of said two segment sets are the mirror images of each other.

4. The apparatus of claim 1, wherein said others of said stacked discs are provided around the circumference of said wall with alternating, radial solid and void segments, and wherein said ones of said discs defined said horizontal flow area openings as annular passageways between them and said cylindrical wall of said cylindrical member.

5. The apparatus of claim 4, wherein said solid discs vary in thickness progressively through said stack.

6. The apparatus of claim 4, wherein said solid discs vary in the diameter of their said peripheries, progressively through the stack.

7. The apparatus of claim 1, and a housing for said disc stack, and a fixed resistance device in said housing and in series with said stack.

8. The apparatus of claim 7, wherein the fixed resistance device comprises a number of horizontal perforated plates, said plates assembled in a vertical stack, the successive plates of the stack being arranged in differently in the stack, the pattern of perforations of said plates being such that said plates provide vertically through said stack a number of tortuous flow paths characterized by abrupt angular turns.

9. The apparatus of claim 1, wherein said disc stack is incorporated in a fluid flow control system comprising also a downstream fluid conduit, and a fixed resistance device in said conduit.

10. The apparatus of claim 9, wherein said fixed resistance device comprises a stack of identical plates, said plates apertured and arranged whereby to provide vertically through said stack a number of energy absorbing flow paths, said flow paths characterized by series restictions and abrupt angular turns.

11. The apparatus of claim 10, wherein said plates comprise alternating, radially inward or outward projecting, substantially solid and wholly void segments, said substantially solid segments comprising two alternating patterns of holes, the one being the mirror image of the other of said two hole patterns.

12. The apparatus of claim 1, wherein the flow resistance of said stack is made to vary with the relative vertical shifting of said stack and said cylindrical member by progressively varying through said stack the number of vertical flow restriction orifices provided by said others of said discs.

13. The apparatus of claim 1, wherein the flow area of said stack is made to vary with the relative vertical shifting of said stack and cylindrical member by the horizontal flow area openings left between said ones of said discs and said cylindrical member being of progressively varying radial extent.

* * * * *

UNITED STATES PATENT AND TRADEMARK OFFICE
CERTIFICATE OF CORRECTION

PATENT NO. : 4,125,129
DATED : November 14, 1978
INVENTOR(S) : Hans D. Baumann

It is certified that error appears in the above-identified patent and that said Letters Patent are hereby corrected as shown below:

At column 14, line 44, the second "the" should be --two--.

At column 15, line 4, "vetical" should be --vertical--.
At column 15, line 41, "a" should be --or--.
At column 16, line 2, "by" should be --by the--.
At column 18, line 2, "in" should be deleted.

Signed and Sealed this

Third Day of July 1979

[SEAL]

Attest:

LUTRELLE F. PARKER

Attesting Officer    Acting Commissioner of Patents and Trademarks